United States Patent
Steckelberg et al.

(10) Patent No.: US 7,691,448 B2
(45) Date of Patent: Apr. 6, 2010

(54) METHOD FOR APPLYING A FILM TO A PLANAR SUBSTRATE, DEFLECTING ELEMENT AND DEVICE FOR APPLYING A FILM TO A PLANAR SUBSTRATE

(75) Inventors: Jurgen Steckelberg, Bleckede (DE); Gerd Brockmann, Lueneburg (DE)

(73) Assignee: Nordson Corporation, Westlake, OH (US)

( * ) Notice: Subject to any disclaimer, the term of this patent is extended or adjusted under 35 U.S.C. 154(b) by 177 days.

(21) Appl. No.: 10/599,935

(22) PCT Filed: Apr. 1, 2005

(86) PCT No.: PCT/EP2005/003444

§ 371 (c)(1),
(2), (4) Date: Aug. 24, 2007

(87) PCT Pub. No.: WO2005/099911

PCT Pub. Date: Oct. 27, 2005

(65) Prior Publication Data

US 2008/0166487 A1     Jul. 10, 2008

(51) Int. Cl.
*B05D 1/30* (2006.01)
(52) U.S. Cl. ........... 427/420; 427/458; 427/485; 427/532; 427/562; 427/207.1; 427/208.2; 427/393.2; 427/348; 427/335; 118/300; 118/305
(58) Field of Classification Search ........ 427/458, 427/485, 532, 562, 207.1, 208.2, 393.2, 420, 427/348, 335; 118/300, 305
See application file for complete search history.

(56) References Cited

U.S. PATENT DOCUMENTS 3,196,063 A     7/1965   Paquin et al.

(Continued)

FOREIGN PATENT DOCUMENTS

EP          0764521 A2      3/1997

(Continued)

OTHER PUBLICATIONS

European Patent Office, International Search Report and Written Opinion in PCT Serial No. PCT/EP2005-003444, Dec. 14, 2005.

*Primary Examiner*—Shamim Ahmed
*Assistant Examiner*—Mahmoud Dahimene
(74) *Attorney, Agent, or Firm*—Wood, Herron & Evans, L.L.P.

(57) ABSTRACT

The invention relates to a method for applying a film to a planar, especially air-impermeable substrate, comprising the steps: (a) feeding the planar substrate in a direction of feed towards an application device, (b) applying a film output by the application device to the planar substrate, and (c) sharply deflecting the planar substrate together with the film that is in contact therewith to a deflection area in a discharge direction different from the direction of feed. The invention also relates to a deflecting element for deflecting a planar substrate. Said element comprises at least one guiding surface adapted to guide a planar substrate and an additional guiding surface, forming an edge for sharply deflecting a planar substrate with the first guiding surface. At least one pressure channel extends through the deflecting element towards the edge and runs into at least one outlet opening in the area of the edge, said opening being configured in such a manner that the pressurized air discharged from said opening forms an air cushion which extends around the edge.

28 Claims, 4 Drawing Sheets

U.S. PATENT DOCUMENTS

Figure 1:
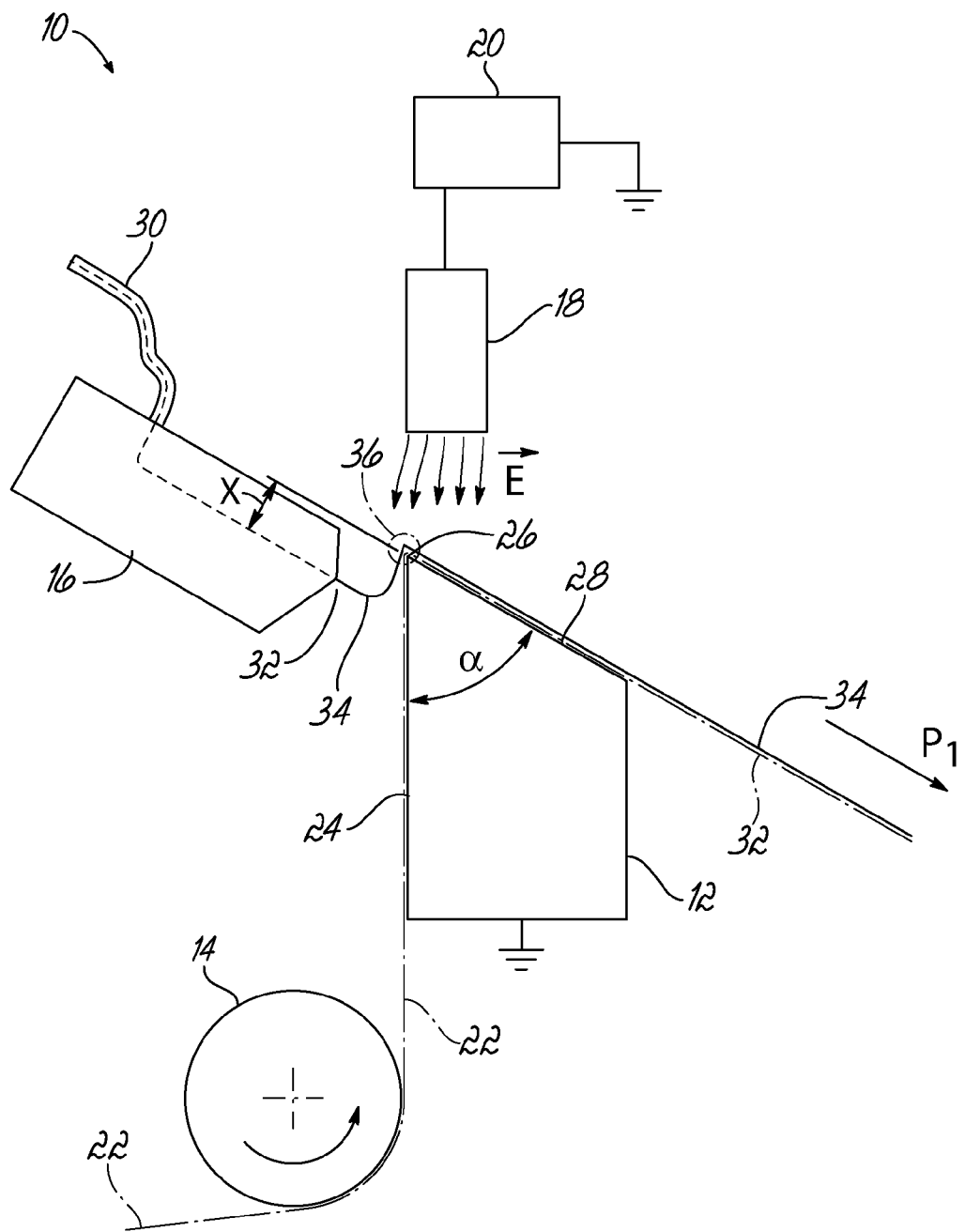

| | | | |
|---|---|---|---|
| 3,788,271 A | | 1/1974 | Carpenter et al. |
| 5,591,496 A | | 1/1997 | Anderson et al. |
| 5,922,407 A | * | 7/1999 | Hess et al. ................ 427/348 |
| 2002/0090463 A1 | * | 7/2002 | Louks et al. ................ 427/420 |

FOREIGN PATENT DOCUMENTS

| | | |
|---|---|---|
| EP | 0875298 A1 | 11/1998 |

* cited by examiner

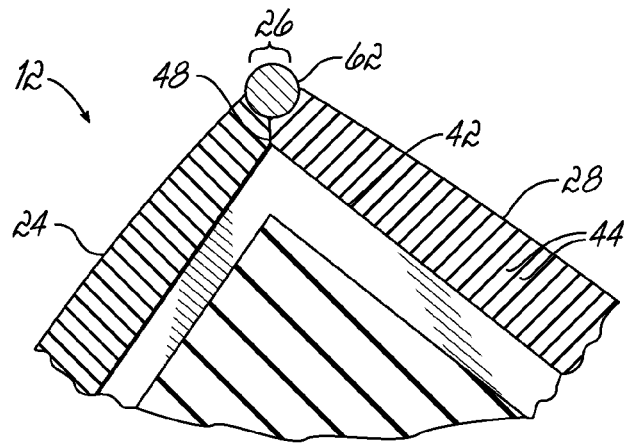
FIG. 4
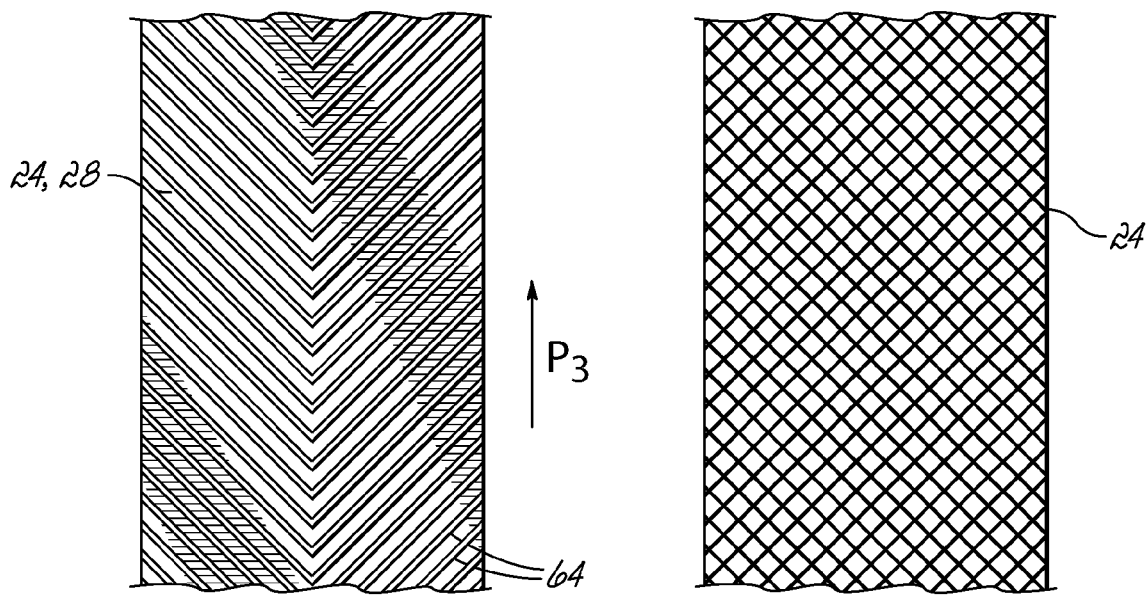
FIG. 5A
FIG. 5B

METHOD FOR APPLYING A FILM TO A PLANAR SUBSTRATE, DEFLECTING ELEMENT AND DEVICE FOR APPLYING A FILM TO A PLANAR SUBSTRATE

The invention relates to a method for applying a film to a planar, in particular an air-impermeable substrate. The invention also relates to a deflecting element for deflecting a planar, in particular an air-impermeable substrate, having at least one guiding surface designed to guide a planar substrate and an additional guiding surface, forming an edge for sharply deflecting a planar substrate with the first guiding surface. According to an additional aspect, the invention relates to a device for applying a film to a planar, in particular an air-impermeable substrate, having a feeding element for feeding the planar substrate and an application device for applying a film. Finally, the invention relates to the use of a deflecting element.

When producing a great many planar product types, such as for example adhesive tapes, protective films, etc. an adhesive film is applied to a planar substrate, for example a transparent plastic film. To that end the adhesive is fed in liquid form to an application device, leaves the latter as a continuous film, and is applied to the substrate in this form. The products can be produced more economically, the higher the possible choice of processing speed with which the adhesive film is applied to the substrate.

It has been found that air inclusions occur increasingly when applying the adhesive at all processing speeds, in particular at high processing speeds. Formation of an air inclusion refers to the effect that air bubbles form between the substrate and the adhesive film. Such air inclusions are perceived by the customer as fabrication defects, and lower the quality of the manufactured products. In addition, they complicate the further processing of the substrates provided with the adhesive film, for example spooling them.

The object of the present invention is to prevent or at least reduce the formation of air inclusions, preferably even at high processing speeds.

The problem is solved according to the invention by a method for applying a film to a planar, in particular an air-impermeable substrate, with the following steps:

Feeding the planar substrate in a direction of feed toward an application device, applying a film emitted by the application device onto the planar substrate, and sharply deflecting the planar substrate together with the film that is in contact therewith in a deflection area in a discharge direction different from the direction of feed.

For sharply deflecting, according to the invention preferably a deflection element of the type named above is used, in which at least one pressurized air duct extends through the deflection element to the edge, which issues into at least one outlet opening in the area of the edge, which is designed so that pressurized air flowing from it forms an air cushion running around the edge.

According to an additional aspect, the problem is solved by a deflection element for deflecting in particular an air-impermeable planar substrate, having at least one guiding surface designed to guide a planar substrate, and an additional guiding surface forming an edge for deflecting a planar substrate with the first guiding surface, in which the two guiding surfaces are positioned at such an angle to each other that the substrate is sharply deflected during its movement along the two guiding surfaces.

Preferred embodiments of the invention are specified in the subordinate claims.

To carry out the method according to the invention, preferably a device of the type named at the beginning is used which includes such a deflecting element. Finally, the problem is solved through the use of a deflecting element of the type named at the beginning to deflect a continuous substrate in a device for applying a film onto the continuous substrate.

The term film refers to a continuous but not necessarily homogeneous layer of material that is emitted from the application device. Examples of this are thin layers of hot glue, plastic films or adhesive tapes. The film is also regarded as having been emitted from the application device if the application device emits one or more substances that form a film on the way to the substrate.

The application of the film to the planar substrate preferably takes place according to the invention in that the film is emitted from the application device in immediate proximity to the planar substrate prior to the deflection of the substrate and initially runs closely adjacent to the substrate. The emitted film and the substrate are then brought into direct contact in the deflection area, so that adhesion occurs between the film and the substrate. After the deflection area the film is present as a coating on the substrate and is bonded to it. In this way an eduction effect is exerted on the film emitted from the application device by the feeding of the substrate, and the film thickness is changeable by the feeding speed of the planar substrate and the speed of emission of the film from the dispensing device.

Sharp deflection in this context means a change of direction of the substrate, which achieves a deflection in regard to the direction and radius of deflection and the feeding speed such that a deflection is achieved in a small space in proportion of the substrate thickness. An important influence for ensuring that the necessary sharp deflection is achieved is the deflection angle, which should be as acute as possible. Ideally, the deflection angle approaches 180°, that is, the direction of motion of the substrate changes by 180°; however, such an acute angle will not be implementable in practice, since technically customary substrates do not survive such a severe deflection at normal deflection radii and cracking or at least partial damage of the substrate must be expected. Another great influence on the achievement of sharp deflection comes from the deflection radius, which should be as small as possible. Here again, the reduction of the deflection radius is limited by the danger of damaging the substrate. The deflection radius and deflection angle are interdependent to a certain extent; that is, with the selection of a small deflection angle a smaller deflection radius can be chosen than if a larger deflection angle is chosen. Conversely, a larger deflection angle must be chosen with a small deflection radius than with a larger deflection radius. Finally, the feeding speed of the substrate is a third influencing factor in connection with the deflection radius and deflection angle to be chosen in order to achieve sharp deflection. The higher the speed of the planar substrate in the deflection area, the greater the deflection angle and the smaller the deflection radius must be in order to achieve the effect intended with the invention.

The deflection area means here the smallest area in the travel path of the substrate, which is behind the coating device and in the vicinity immediately following the latter moves in a linear motion. Hence it is the zone in which the deflection occurs, and in which the radius of curvature of the substrate travel path differs sharply from the radii of curvature in the adjacent zones. The substrate travel path is the path that a part of the substrate covers during the process.

The invention offers the advantage that the likelihood of air inclusions when applying a film to a planar substrate is significantly reduced. The sharp deflection causes air that may still be present between the substrate and the film to be pressed and/or sucked out of this intermediate space, so that such air cannot form air inclusions.

Particularly advantageous is the fact that the reduction of the air inclusions is achieved even at high to very high feeding speeds and the high processing speeds achievable thereby. The reduction of air inclusions is achieved even if both the substrate and the film are air-impermeable; in such a case even very small quantities of air would no longer be able to escape after the film is applied.

High processing speeds are those above 150 m/min, very high processing speeds are those above 500 m/min.

An additional benefit of the invention is the high level of reliability of the process. With systems that are operated continuously, production interruptions result in substantial costs. The high process reliability thus also contributes to lower costs.

In a preferred embodiment, the sharp deflection of the planar substrate is achieved through the fact that the radius of curvature of the planar substrate on the side facing the film is smaller than 8 mm in the deflection area. This radius of curvature is calculated using an equalizing circle that is written into the contour of the substrate in the deflection area. Because of the small radius of curvature, a large angle arises in the deflection area between the substrate and the film being brought into contact with the substrate, compared to previous methods. Due to this large angle, the air that is present in this area is forced out of the area in which the film comes into direct, i.e. physical contact with the substrate. This greatly reduces the likelihood of air inclusions.

It is especially preferred for the radius of curvature to be smaller than 6 mm, in particular smaller than 4 mm. The smaller the radius of curvature, the more effectively the air is forced out of the space between substrate and film, and hence the smaller is the likelihood of air inclusions. From this perspective, the goal is thus to have the smallest possible radii of curvature. On the other hand, the load on the substrate is greater, the smaller the radius of curvature. In particular, the risk of cracks or creases grows. Hence it must be determined for each substrate in a series of trials how small a radius of curvature can be chosen for a given processing speed for there to be no damage to the substrate.

Preferably, the deflection of the planar substrate is effected by moving the planar substrate, in particular by drawing it over an edge. An edge permits the shaping of a small radius of curvature with means of simple design. At the same time, this achieves a rigid structure that reduces vibrations.

It is preferred for the deflection of the planar substrate to be effected by moving the planar substrate, in particular by drawing it over an edge whose radius of curvature is smaller than 3 mm, in particular 2 mm, less the thickness of the substrate.

In a preferred embodiment of the method, the planar substrate is influenced in the deflection area at the edge by an air cushion. In the deflection at the edge a force acts on the substrate. This force acts perpendicular to the part at which the deflection occurs, so that there is friction. To keep the load on the substrate as small as possible, it is important to keep the friction as small as possible. By influencing the planar substrate in the deflection area at the edge by means of an air cushion, the friction can be reduced significantly, which protects the planar substrate in regard to both mechanical and thermal influences. If the air cushion is formed of cold air, then in addition the planar substrate is cooled in the deflection area. That is especially advantageous if the film being applied is a hot glue film. In the deflection area the planar substrate then comes into intimate contact with the hot glue film, which subjects it to a thermal load. This thermal load is reduced by an air cushion of cooled air.

It is especially preferred for the substrate to be influenced by the air cushion in such a way that it does not come into direct contact with the edge. In that case there is no solid body friction between the planar substrate and the deflecting part, but merely fluid friction between the planar substrate and the air cushion, as well as between the deflecting part and the air cushion. Such fluid friction is significantly weaker in nature than solid body friction between planar substrate and deflecting part, so that thermal and mechanical loads are reduced, The influencing of the planar substrate in the deflection area by means of an air cushion occurs in particular because air that emerges from outlet openings in the area of the edge forms an air cushion between the edge and possibly an area around the edge on one hand and the substrate on the other hand. The air forming the air cushion should be under at least sufficient pressure so that the pressing force exerted by feeding and deflecting the substrate on the edge and the edge area is overcome and the most complete possible separation of the substrate from the edge and the edge area is achieved.

Preferably the planar substrate is a transparent film. Air inclusions are especially conspicuous to the eye with transparent films. For that reason, use of the method according to the invention, which reduces air inclusions, is especially advantageous.

In a preferred embodiment of the method, at a location in direct proximity to the planar substrate the film is brought to the planar substrate, which is at a distance of 0-20 mm, in particular 1-10 mm from the deflection area. During application of the film to the planar substrate and the subsequent deflection of the substrate an adhesive force is formed between the two components, on the basis of which they ultimately adhere to each other. As that occurs, air that is present in the space between film and substrate is forced out of this space, in part due to dynamically produced local air pressure changes. If the distance between the place at which the film comes into direct proximity to the planar substrate and the deflection area is too small, the air does not have enough time to leave this space. If the distance is too large, there is a risk that film and substrate will adhere to each other already before the deflection, so that in the subsequent sharp deflection the air is hindered from escaping and air inclusions can form.

A method is preferred in which the sharp deflection of the substrate is achieved by the angle enclosed between the input direction and the exit direction in the vicinity of the deflection area being 40°-110° (corresponding to a deflection angle of 140°-70°), in particular 50°-80° (corresponding to a deflection angle of 130°-100°), in particular 55°-65° (corresponding to a deflection angle of 125°-115°). The smaller the enclosed angle, the greater is the likelihood that air inclusions will be prevented. But as the angle decreases, the load on the substrate also rises. Preliminary trials must therefore be conducted for each substrate, each film and each processing speed in order to determine how small this enclosed angle can be without damage occurring to the substrate.

It is preferred that the planar substrate be fed as a continuous substrate. In that case the method of applying the film can be carried out as a continuous process. Since any startup problems of the method are largely prevented thereby, or in particular occur only once as the process is started, especially efficient and hence economical production is possible in this way.

In a preferred embodiment, the substrate is initially guided on a preferably cooled guide roller, then is guided away from the guide roller along a deflection roller with a smaller diameter than that of the guide roller to the application device, and after deflection is routed back to the guide roller. In this case the speed with which the film is applied to the planar substrate is determined by the speed of rotation of the guide roller. In addition, the tension of the substrate and hence the tension on the substrate in the deflection area is very sensitively adjustable by regulating the distance between the deflection process and the guide roller. Thermal damage to heat-sensitive substrates is reduced or prevented by the fact that the guide roller and/or the deflection element is cooled.

A preferred embodiment includes the provision that the planar substrate is exposed to an electrostatic field in the deflection area, which has a field strength of more than 5 kV/m in at least one place in the deflection area. Experiments have shown that such an electrostatic field additionally reduces the tendency toward air inclusions. The curvature of the deflection element in the area of the edge produces a beneficial reinforcement of the field strength in the deflection area, since a concentration of field lines occurs. Such a field reinforcement can also be accomplished by reducing the distance between electrode and deflection element.

A deflection element is preferred that has an edge with a radius of curvature of less than 5 mm, in particular less than 3 mm, in particular less than 2 mm. If a planar substrate is drawn over such an edge, then if the planar substrate is always in contact with the deflection element a correspondingly small radius of curvature occurs in the deflection area on the side facing the film, the advantages of which are described above.

Preferably, the additional surface which encloses an edge with the guide surface is likewise a guide surface designed to guide the planar substrate.

It is preferred that the enclosed angle formed by the guide surfaces in the vicinity of the edge be smaller than 120°, in particular between 45° and 90°, in particular between 55° and 75°. If one or both guide surfaces are curved, the angle formed in the vicinity of the edge is determined by drawing a regression line from the length of the diameter of the deflection area into the guide surfaces and determining the angle between the two regression lines.

The enclosed angle formed by the guide surfaces in the vicinity of the edge represents a compromise between an enclosed angle as slightly as possible smaller than 180°, to avoid loads on the planar substrate and an enclosed angle as slightly as possible greater than 0° to decrease air enclosures. Experiments have shown that angles between the intervals above result in a reduction of the tendency to form air enclosures.

Preferably at least one guide surface has a convexity, in particular a convexity whose radius of curvature is between 300 mm and 2000 mm. A convex surface can be described in a first approximation by a paraboloid. Such a paraboloid has two main axes, and accordingly two radii of curvature. If these two radii of curvature are chosen between 300 and 2000 mm, the substrate will nestle closely to the deflection element. That results in uniform feeding of the substrate without folds occurring in the substrate.

In a preferred embodiment, the edge of the deflection element is formed by a rod with as small a diameter as possible, preferably under 8 mm, in particular in the range of about 3-6 mm. In particular, a rotatably mounted bar can be used, which is preferably at least also supported by the air cushion. Arbitrarily reducing the diameter of the bar is restricted by the necessary mechanical load-bearing capacity of the bar. With all bar diameters, in particular with small bar diameters, the supporting of the bar can be accomplished advantageously by means of an air cushion. This air cushion is produced for example within a cavity that partially surrounds the bar, which receives the bar and protects it against falling out, by means of an air duct formed in the deflection element which extends into the cavity.

If the bar is rotatably mounted, when the substrate is deflected there is almost no sliding friction in the area of the edge, which reduces the thermal stress on the planar substrate. The friction is further reduced by the air cushion support.

By preference, the guide surfaces are designed as air cushion surfaces. An air cushion surface is a surface that is connectable to a pressurized air supply in such a way that when a substrate is lying on the air cushion surface an air cushion forms between the two. This reduces the friction between planar substrate and deflecting element, as already explained above, so that the thermal stress on the planar substrate is reduced. By using cooled air to form the air cushion, the planar substrate can also be cooled, which reduces the thermal stress on the latter.

It is preferred that the edge be formed of a surface that is permeable for pressurized air, in particular a screen or mesh element. This achieves a defined edge of the deflecting element and the formation of a stable air cushion.

In a preferred embodiment, ducts running inside the deflection elements are provided to receive coolants. Possibilities for coolants are for example water, oil, air and working gases used in refrigeration systems. Especially with a hot glue film and/or low substrate speeds there can be thermal stresses on the planar substrate, since the hot glue is in contact with the substrate over a long time period before the substrate reaches the cooled guide roller. Through the coolant present in the ducts, first the deflecting element and through it the planar substrate is cooled. If there is an air cushion between the planar substrate and the deflecting element, then the coolant also first cools the air that forms the air cushion, and thus indirectly the planar substrate.

In a preferred embodiment the deflecting element has herringbone-patterned surface corrugation on the guiding surface, in particular on the guiding surfaces. The surface corrugation is positioned so that the planar substrate is extended outward over the surface corrugation perpendicular to the direction of motion when moving along the guide surface. In this way the tendency of the substrate to form folds is reduced.

In a preferred embodiment, a fine-meshed fabric is provided on the guide surface, in particular the guide surfaces. The function of the fine-meshed fabric is to distribute outflowing pressurized air in such a way that a homogeneous air cushion is formed. In a homogeneous air cushion the differences in air pressure, air flow and air temperature within the air cushion are so small that they do not harm the substrate. A fabric that has more than 10 threads/cm is considered fine-meshed.

In an especially preferred embodiment of a device for applying a film, the application device is positioned so that the point of the substrate travel path at which the latter is at a minimum distance from the dispensing orifice is located between 0 and 20 mm, in particular between 1 and 10 mm ahead of the edge of the deflecting element. Experiments have shown that the formation of air inclusions can be especially effectively reduced thereby.

In an especially preferred embodiment a counter-electrode is positioned in the vicinity of the deflection area in such a way that the path of the continuous substrate runs between the deflecting element and the counter-electrode, and the counter-electrode is electrically insulated against other elements, in particular all other elements of the device, and is chargeable by means of a voltage source to an electrical potential of at least 1 kV compared to the other elements of the device. As a result of this measure, the deflecting element only has an electrical potential with respect to the counter-electrode, and all other components are uncharged. In addition, the position of the counter-electrode can be chosen so that the distance between the deflecting element and this counter-electrode is small, so that an especially strong electrical field can be chosen.

Alternatively or in addition to what has just been stated, there can be provision for the deflecting element to be electrically insulated from other elements, in particular all other elements of the device and to be chargeable by means of a voltage source to an electrical potential of at least 1 kV compared to the other elements of the device. As a result, an electrical field is built up between the deflecting element and the other elements of the machine. If this electrical potential is produced in addition to and with the opposite sign to a potential of a counter-electrode, the electrical field can be reinforced. The field lines of the electrical field concentrate at the edge of the deflecting element, and there form an especially strong, non-homogeneous electrical field. The electrical field has the effect of further reducing the tendency to form air inclusions.

Figure 2:
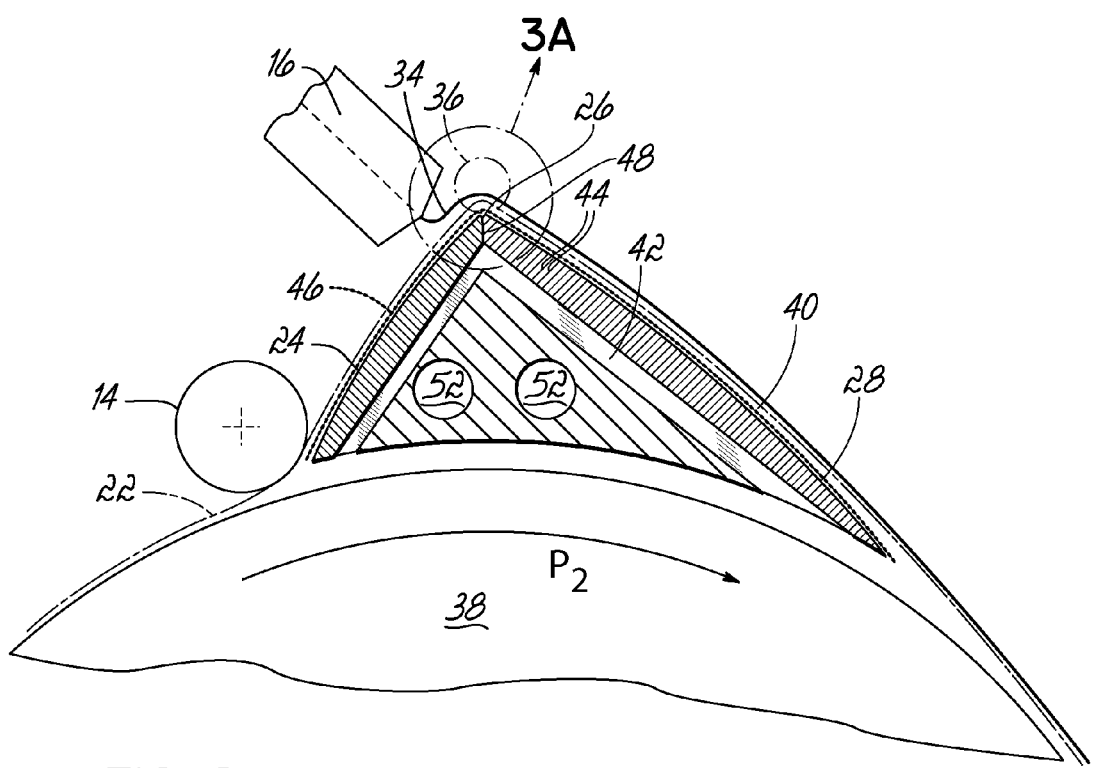
Figure 3A:
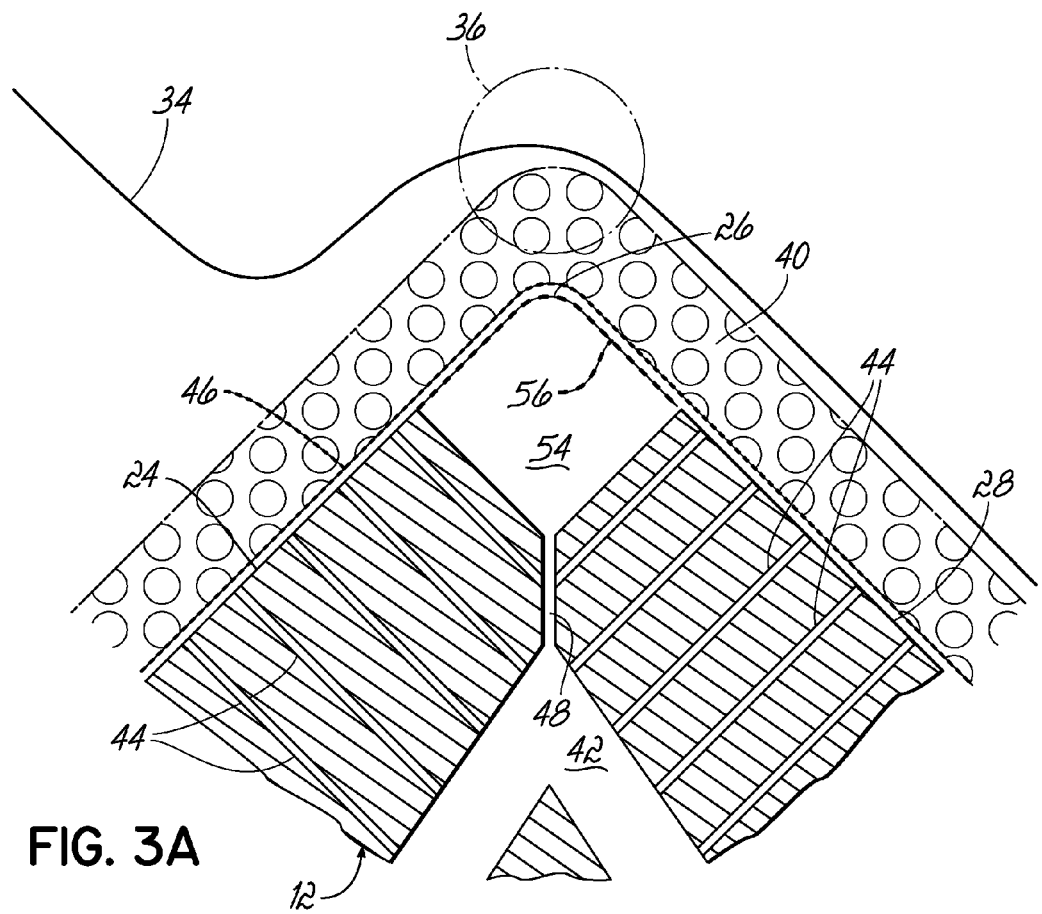

Two exemplary embodiments of the invention will be explained in greater detail below on the basis of the drawing. The figures show the following:

FIG. 1: a schematic depiction of a device and a method for applying an adhesive film, FIG. 2: an alternative embodiment of such a device and such a method, FIG. 3a: The detail of FIG. 2 identified as A, FIG. 3b: the detail of the deflecting element according to FIG. 2 located below Detail A, FIG. 4: an alternative design of the edge of a deflecting element according to FIG. 3a, and FIGS. 5a, b: schematic depictions of two surface structures of the deflecting element from FIG. 2.

FIG. 1 shows an application device 10 which includes an essentially wedge-shaped deflecting element 12, a cooled deflecting roller 14, an application head 16, a counter-electrode 18 and a line adapter 20.

A continuous substrate 22 made of polypropylene (PP), polyethylene (PE) or polyethylene terephthalate (PET) 20-100 pm thick, with a speed of up to 600 m/min, is deflected by deflecting roller 14 in the direction of application head 16. Continuous substrate 22 runs along a feeding guide surface 24 of deflecting element 12, is sharply deflected at an edge 26 of deflecting element 12, and then runs out along a discharge guide surface 28 in the direction of arrow P.

Deflecting roller 14 is designed as a cooling roller, with the connections for the coolant not shown in the drawing. The cooling may cool the substrate 22 as far as the dew point. It is then guided along the feeding guide surface 24 and reaches the vicinity of application head 16.

Application head 16 is supplied with liquid hot glue at a temperature of 150° C. through a glue supply line 30. This temperature is to be set depending on the material properties of the substrate and of the hot glue. The hot glue leaves application head 16 through a discharge aperture 32 in the form of a thin, transparent adhesive film 34. The application head and its discharge aperture are positioned in relation to the deflecting element in such a way that the adhesive film 34 emerges approximately parallel to the discharge direction of the substrate and at a distance of an offset identified as x from the edge 26 of deflecting element 12 in the feeding direction. The adhesive film 34 comes into immediate proximity with the continuous substrate 22 at a location which is ahead of this edge in the running direction of the continuous substrate. At this location first an approach to a very small distance between continuous substrate 22 and adhesive film 34 is reached, but no direct contact.

After adhesive film 34 and continuous substrate 22 have come into immediate proximity with each other, both are sharply deflected by being jointly drawn over the edge 26. To that end, a tensile force is exerted on the continuous substrate 22 by a device not shown in the drawing on the continuous substrate, acting in the direction of the arrow P. The angle a between feeding guide surface 24 and discharge guide surface 28 is 60°. The radius of curvature of continuous substrate 22 at the moment in which it is drawn over edge 26 is 2 mm. Accordingly, the radius of curvature of the travel path of the continuous substrate on the edge 26 is likewise 2 mm. Due to the sharp deflection, the continuous substrate 22 and the adhesive film 34 come into direct contact and adhere to each other without air inclusions.

Deflecting element 12 is grounded. In an extension of feeding guide surface 24 and shifted laterally in relation to discharge guide surface 28, counter-electrode 18 is located opposite discharge guide surface 28. It is charged by a generator 20 compared to the electrical zero level to a constant high voltage of 10-30 kV. That causes an electrical field E to form between deflecting element 12 and counter-electrode 18, which is especially large at the edge 26 due to the curvature of the latter, since the electrical field lines concentrate here.

FIG. 2 shows an alternate embodiment of application device 10. Continuous substrate 22 first runs on a guide roller 38 which is cooled, possibly to the dew point, and which rotates in the direction of the arrow P. From guide roller 38 the continuous substrate 22 is deflected by deflecting roller 14 and runs along the feeding guide surface 24 of deflecting element 12, around the edge 26 and along the discharge guide surface 28, from where it again reaches the guide roller 38.

Deflecting element 12 has essentially a triangular cross section, although the longest side, which faces the guide roller 38, is of concave design and has a radius of curvature that corresponds to the radius of the guide roller 38.

The two other side surfaces of deflecting element 12 are slightly convex. One main axis of the respective nestling paraboloid runs parallel to the axis of rotation of guide roller 38; the other main axis runs perpendicular to it and along the travel path 22. In both main directions the radius of curvature is greater than that of guide roller 38, and is for example 1000 mm in reference to the main axis that runs parallel to the axis of rotation of guide roller 38 and also 1000 mm in reference to the other main axis.

Between the continuous substrate 22 and the deflecting element 12 there is an air cushion 40. A cavity 42 is provided in the interior of deflecting element 12 to build up this air cushion 40. The latter is connected via a connection, not shown in the drawing, to a pressurized air source, also not shown in the drawing, so that the cavity 42 is filled with pressurized air. The pressurized air escapes from cavity 42 through a plurality of bores 44 and reaches the surface of deflecting element 12. There it passes to the outside through a fine-meshed fabric 46 that represents part of the deflecting element 12, and forms the air cushion 40 between the continuous substrate 22 and the deflecting element 12.

A slit 48 runs from the edge 26 into the cavity 42. Pressurized air also emerges through slit 38 in the area of edge 26 and forms an air cushion around edge 26.

In the area of edge 26 continuous substrate 22 is sharply deflected in the deflection area. Deflection area 36 is the area of the substrate travel path at which the curvature changes severely. In the area of feeding guide surface 24 the radius of curvature of continuous substrate 22 corresponds essentially to the curvature of feeding guide surface 24; correspondingly, the radius of curvature of the substrate travel path in the area of discharge guide surface 28 is essentially equal to the radius of curvature of the latter. Between the two areas is deflection area 36, in which the radius of curvature is now only 1-6 mm instead of 1000 mm.

Liquid hot glue is dispensed from application head 16 onto continuous substrate 22 in the form of an adhesive film 34. The adhesive film 34 comes into immediate proximity with continuous substrate 22, but not into direct contact. In the space between the adhesive film 34 and the continuous substrate 22 there is air. If the adhesive film 34 and the continuous substrate 22 are sharply deflected in deflection area 36, the adhesive film is brought into direct contact with the substrate, and in the process this air is pressed out of this space contrary to the direction of motion of the substrate. As a result, the adhesive film 34 then adheres to continuous substrate 22 without air inclusions.

Because of the input of heat through the hot glue that forms the adhesive film 34, a warming of the continuous substrate 22 initially occurs in the deflection area. To preclude possible thermal damage, the pressurized air in the cavity 42 and the deflecting element are cooled. To that end one or more coolant ducts 52 are provided in the deflecting element 12. The coolant ducts 52 run parallel to the axes of rotation of guide roller 38 and deflecting roller 14. To improve the transfer of heat from the pressurized air to the coolant, the deflecting element is made of material with good conductivity.

In an alternative embodiment, the deflecting element or surface sections of the deflecting element are produced from a sintered metal. On the one hand, sintered metals are suitable for forming sliding surfaces. On the other hand, with sintered metals an open porosity can be set, which can be used advantageously in the application according to the invention to form the air cushion. That makes it possible to produce the slideways of the deflecting element at least partially of an open porous sintered metal and to connect this sintered metal to a pressurized air connection, so that air under pressure emerges from the pores of the sintered metal and the air cushion is formed between the substrate and the surface of the sintered metal.

The tension to which the continuous substrate 22 is subject on its way along the deflecting element 12 is regulated by means of the distance from the deflecting element 12 to the center point of the guide roller 38, which represents the reference variable. The distance between the substrate 22 and the edge 26 or the frequency of air inclusions for example are used as control variables.

FIG. 3a shows an alternative embodiment of a deflecting element 12. The slit 48 running from cavity 42 to edge 26 ends in a cavity 54, which is bounded from edged 26 by a very fine-meshed screen 56. The fabric 46 extends from the feeding guide surface 24 over the screen 56 along the discharge guide surface 28. The thickness of the air cushion 40 can be varied in the area of the edge, depending on how far the screen 56 extends over the edge 26. As an alternative to the screen, a perforated sheet or the like is also usable.

Figure 3B:
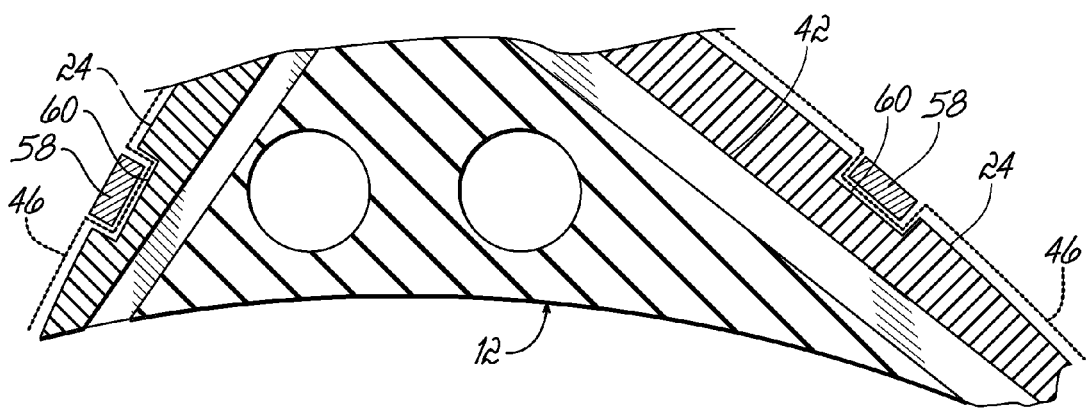

FIG. 3b shows the attachment of the fabric 46 by means of clamping blocks 58, which clamp the fabric firmly in a recess 60 and thereby prevent it from being lifted off by the pressurized air flowing from the interior of the deflecting element. The clamping blocks 58 are attached with countersunk screws, which are not visible in this view.

FIG. 4 shows an alternative embodiment of the edge 26 of deflecting element 12. Between feeding guide surface 24 and discharge guide surface 28 there is a bar 62, which is rotatably supported by ball bearings, not shown here in the drawing. The bar 62 has a diameter of 2 mm, and is positioned so that nearly half of its girth projects over the extensions of feeding guide surface 24 and discharge guide surface 28.

FIG. 5a shows a schematic view of the surface consistency of feeding guide surface 24 and/or discharge guide surface 28. Straight-line corrugations 64 are formed on the guide surface, i.e. elevations that rise above the base surface of the feeding guide surface. These corrugations 64 are given a chromium overlay to reduce friction, and are arranged in a herringbone or V pattern so that two corrugations come together in a point. All such points lie on a straight line that runs parallel to the sides of the guide surface.

The continuous substrate, not shown here in the drawing, moves in the direction of the arrow P. The arrangement of the corrugations 64 causes the continuous substrate to be pulled apart while sliding on the guide surface, so that a tendency of the substrate to form folds is reduced.

FIG. 5b shows a schematic top view of feeding guide surface 24, over which the fabric 46 is stretched. The fabric 46 has a canvas binding and a thread density of 10 threads/cm. Beneath the fabric 46, and thus not visible in the top view, end the branch bores 44 from which pressurized air flows. The fabric 46 distributes the pressurized air, so that a homogeneous air cushion forms.

What is claimed is:

1. A method of applying a film to a substrate with an application device including a deflecting element having a planar feeding guide surface, a planar discharge guide surface, an edge between the planar feeding guide surface and the planar discharge guide surface, and an application head, wherein the application head is spaced apart from the substrate, the method comprising:

feeding the substrate upwardly along the planar feeding guide surface toward the application head;

discharging the film from the application head into immediate proximity with the substrate; and deflecting the substrate and film at the edge so that the substrate and the film come into direct contact and adhere to each other while preventing air inclusions and travel downwardly along the planar discharge guide surface and at an angle to the planar feeding guide surface.

2. The method of claim 1 wherein applying the film further comprises:

discharging the film from the application head in a downward direction substantially parallel to and offset from the planar discharge guide surface.

3. The method of claim 1, further comprising:

cooling the substrate before feeding the substrate along the planar feeding guide surface.

4. The method of claim 1 wherein the planar discharge guide surface is angled less than approximately 110° from the planar feeding guide surface, and deflecting the substrate and film at the edge further comprises:

deflecting the substrate and film around a radius of curvature of less than approximately 8 mm.

5. The method of claim 4 wherein the planar discharge guide surface is angled less than approximately 65° from the planar feeding guide surface, and deflecting the substrate and film at the edge further comprises:

deflecting the substrate and film around a radius of curvature of less than approximately 8 mm.

6. The method of claim 1, further comprising:
forming an electrical field at a location where the substrate and film are deflected to further reduce the formation of air inclusions.

7. The method of claim 6 wherein forming the electrical field further comprises:
forming the electrical field with a field strength greater than approximately 5 kV/in.

8. The method of claim 1 further comprising:
forming an air cushion between the substrate and the deflecting element.

9. The method of claim 1 wherein feeding the substrate along the planar feeding guide surface further comprises:
feeding the substrate at a speed greater than approximately 150 m/min.

10. The method of claim 1, further comprising:
cooling the substrate as it travels along at least one of the planar feeding guide surface or the planar discharge guide surface.

11. A deflecting element for guiding a substrate while a film is applied thereto, comprising:
a body having an edge defined by a surface permeable by pressurized air, a planar feeding guide surface adapted to guide the substrate upwardly toward said edge, a planar discharge guide surface positioned at an angle relative to said planar feeding guide surface and adapted to guide the substrate downwardly away from said edge, at least one cavity adapted to receive pressurized air, and a first duct extending from said cavity to said surface of said edge to allow pressurized air to flow to said edge and form an air cushion between the substrate and said edge on a side of the substrate opposite to the film.

12. The deflecting element of claim 11 wherein said edge has a radius of curvature of less than approximately 8 millimeters and the angle between said planar feeding surface and said planar discharge guide surface is less than approximately 120°.

13. The deflecting element of claim 12 wherein said edge has a radius of curvature of less than approximately 8 millimeters and the angle between said planar feeding surface and said planar discharge guide surface is less than approximately 75°.

14. The deflecting element of claim 11, further comprising:
a second duct adapted to receive coolant material, said second duct being positioned proximate at least one of said planar feeding guide surface or said planar discharge guide surface.

15. The deflecting element of claim 11 wherein at least one of said planar feeding guide surface or said planar discharge guide surface includes corrugations arranged in a V-shaped pattern.

16. The deflecting element of claim 11, further comprising:
an edge cavity formed at a junction between said planar feeding guide surface and said planar discharge guide surface and communicating with said first duct,
a screen extending over said edge cavity;
a fabric positioned over said screen and at least one of said planar feeding guide surface or said planar discharge guide surface.

17. The deflecting element of claim 11, further comprising:
a plurality of bores extending from said cavity to at least one of said planar feeding guide surface or said planar discharge guide surface.

18. The deflecting element of claim 11 wherein at least one of said planar feeding guide surface or said planar discharge guide surface is convex.

19. The deflecting element of claim 18 wherein said at least one of said planar feeding guide surface or said planar discharge guide surface has a radius of curvature between approximately 300 mm and approximately 2000 mm.

20. A device for applying a film to a substrate, comprising:
a deflecting element having an edge, a planar feeding guide surface adapted to guide the substrate upwardly toward said edge, and a planar discharge guide surface adapted to guide the substrate downwardly away from said edge, and
an application head spaced apart from said planar feeding guide surface and configured to discharge the film into immediate proximity with the side of the substrate opposite the planar feeding guide surface and at a location offset from said edge;
said planar discharge guide surface being positioned at an angle relative to said planar feeding guide surface so that the substrate and the film are deflected when moving over said edge and the substrate and the film come into direct contact and adhere to each other while preventing air inclusions and travel downwardly along the planar discharge guide surface and at an angle to the planar feeding guide surface.

21. The device of claim 20 wherein said application head is configured to discharge the film along a location offset from said edge by less than approximately 10 mm.

22. The device of claim 20 wherein said application head is configured to discharge the film along a direction substantially parallel to said planar discharge guide surface.

23. The device of claim 20, further comprising:
a deflecting roller adapted to direct the substrate along a direction substantially parallel to said planar feeding guide surface of said deflecting element, said deflecting roller further adapted to cool the substrate.

24. The device of claim 20 wherein said deflecting element has a substantially triangular cross-section defined by said planar feeding guide surface, said planar discharge guide surface, and a base surface, the device further comprising:
a guide roller adapted to carry the substrate, said deflecting element being spaced apart from said guide roller with said base surface facing said guide roller; and
a deflecting roller configured to direct the substrate from said guide roller to said planar feeding guide surface, said planar discharge guide surface being configured to direct the substrate back to said guide roller after the substrate and film are deflected over said edge.

25. The device of claim 24 wherein at least one of said deflecting roller or said guide roller is adapted to cool the substrate.

26. The device of claim 24 wherein said base surface is concave so as to generally conform to the shape of said guide roller, and at least one of said planar feeding guide surface or said planar discharge guide surface is convex.

27. The device of claim 20, further comprising:
an electrode spaced apart from said edge and adapted to cooperate with said deflecting element to create an electrical field therebetween to further reduce air inclusions.

28. The device of claim 27 wherein said electrode is electrically insulated from said deflecting element and said application head, the device further comprising:
a voltage source adapted to charge said electrode to an electric potential of at least approximately 5 kV.

* * * * *

UNITED STATES PATENT AND TRADEMARK OFFICE
CERTIFICATE OF CORRECTION

PATENT NO. : 7,691,448 B2  Page 1 of 1
APPLICATION NO. : 10/599935
DATED : April 6, 2010
INVENTOR(S) : Jurgen Steckelberg et al.

It is certified that error appears in the above-identified patent and that said Letters Patent is hereby corrected as shown below:

Column 11

Claim 7, line 4, change "5 kV/in." to --5 kV/m.--.

Signed and Sealed this

Thirteenth Day of July, 2010

David J. Kappos
*Director of the United States Patent and Trademark Office*